US006995487B2

(12) United States Patent
Simpson et al.

(10) Patent No.: US 6,995,487 B2
(45) Date of Patent: Feb. 7, 2006

(54) ENDPLAY ADJUSTMENT AND BEARING DECOUPLING IN AN ELECTRIC MOTOR

(75) Inventors: Stan Simpson, St. Thomas (CA); Bryan Todd Fisher, Appin (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/897,963

(22) Filed: Jul. 23, 2004

(65) Prior Publication Data
US 2005/0018935 A1 Jan. 27, 2005

Related U.S. Application Data

(60) Provisional application No. 60/490,306, filed on Jul. 25, 2003.

(51) Int. Cl.
*H02K 5/16* (2006.01)
(52) U.S. Cl. .......................................... 310/90; 310/89
(58) Field of Classification Search ............ 310/89–91, 310/154.01, 233, 238, 254, 261
See application file for complete search history.

(56) References Cited

U.S. PATENT DOCUMENTS

| 3,480,813 A | * | 11/1969 | Sillano ........................ 310/241 |
| 6,382,936 B1 | * | 5/2002 | Schuler et al. ............ 417/423.1 |
| 6,452,299 B2 | * | 9/2002 | Drexlmaier ................... 310/91 |

* cited by examiner

*Primary Examiner*—Thanh Lam

(57) ABSTRACT

An electric motor (10) has an armature structure (12) including a shaft (14), a lamination stack (11) coupled with the shaft, a commutator (16) coupled with the shaft, and windings (13) carried by the lamination stack and connected to the commutator. Brushes (17) engage the commutator to deliver electric current to the windings. The motor includes a frame structure (18) carrying permanent magnets (19), at least one sleeve bearing (20) operatively associated with an end of the shaft to support the shaft for rotation, and a unitary bearing retainer structure (22) coupled with the frame structure and holding the at least one sleeve bearing. The retainer structure is constructed and arranged 1) to prevent movement of the retainer structure in a direction towards the end of the shaft, 2) to provide a spring force against the frame structure to prevent the retainer structure from moving in a direction away from the end of the shaft, and 3) to control endplay of the armature structure by controlling engagement of the retainer structure with the frame structure.

23 Claims, 2 Drawing Sheets

ENDPLAY ADJUSTMENT AND BEARING DECOUPLING IN AN ELECTRIC MOTOR

This application is based on U.S. Provisional Application No. 60/490,306, filed on Jul. 25, 2003, and claims the benefit thereof for priority purposes.

FIELD OF THE INVENTION

The invention relates to a sleeve bearing assembly of an electric motor for reducing bearing noise and for adjusting endplay of an armature of the motor.

BACKGROUND OF THE INVENTION

In any rotating electrical device bearing noise is a significant contributor to the overall motor noise. In an electric motor with one or two sleeve bearings that are used for both axial thrust surfaces and cylindrical running surfaces, the bearing related noise consists of four main components:

1) Bearing/Shaft Friction Noise created by the interface of two sliding surfaces
2) Commutator Brush Noise/vibration transmitted through the commutator to the shaft to the bearing
3) Cogging Torque Noise transmitted from the cogging lamination in the magnetic circuit to the shaft to the bearing
4) Axial thrust surface noise caused by the interaction of the axial thrust washer and the bearing.

All of these noises associated with the bearing are amplified when considering the noise/vibration path to the adjacent structure. Bearing/structure noise is created by vibration transferred to the adjacent resonating structure. Thus, there is a need to reduce this noise while providing endplay adjustment.

SUMMARY OF THE INVENTION

An object of the invention is to fulfill the need referred to above. In accordance with the principles of the present invention, this objective is achieved by providing an electric motor having an armature structure including a shaft, and frame structure. At least one sleeve bearing is operatively associated with an end of the shaft to support the shaft for rotation, and a unitary bearing retainer structure is coupled with the frame structure and holds the sleeve bearing. The retainer structure is constructed and arranged 1) to prevent movement of the retainer structure in a direction towards the end of the shaft, 2) to provide a spring force against the frame structure to prevent the retainer structure from moving in a direction away from the end of the shaft, and 3) to control endplay of the armature structure by controlling engagement of the retainer structure with the frame structure.

In accordance with another aspect of the invention, a method is provided for setting endplay of an armature structure of a motor. The motor includes a frame structure having a pair of posts extending therefrom and a pair of sleeve bearings for supporting a shaft of the armature structure. The motor further includes a retainer structure including a main body defining a bearing receiving opening that receives one of the sleeve bearings, resilient bearing holding members extending from the main body, and a pair of bores in the main body. The method includes the steps of holding the armature structure within the frame structure, inserting the one sleeve bearing into the retainer structure so as to hold the one sleeve bearing via the holding members thereby locating and positioning the one sleeve bearing in the frame structure, placing the retaining structure with one sleeve bearing therein onto an end of the shaft, moving retaining structure with the one sleeve bearing therein so that the posts are received by the bores and until the desired endplay is set, and ensuring that the retainer structure is secured with respect to the frame structure.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
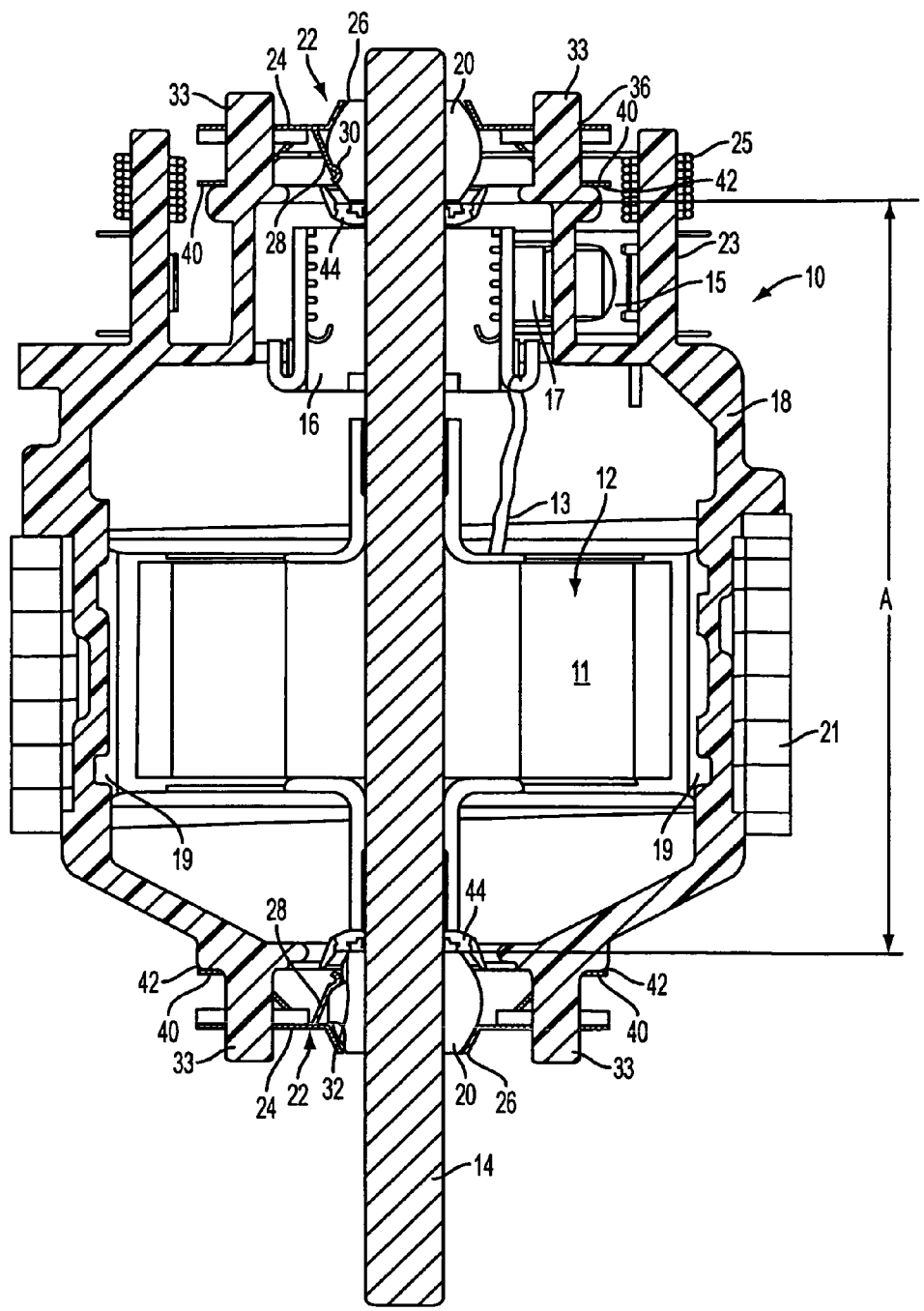
FIG. 1 is a cross-sectional view of an electric motor having bearing retainer structures of the invention.
Figure 2:
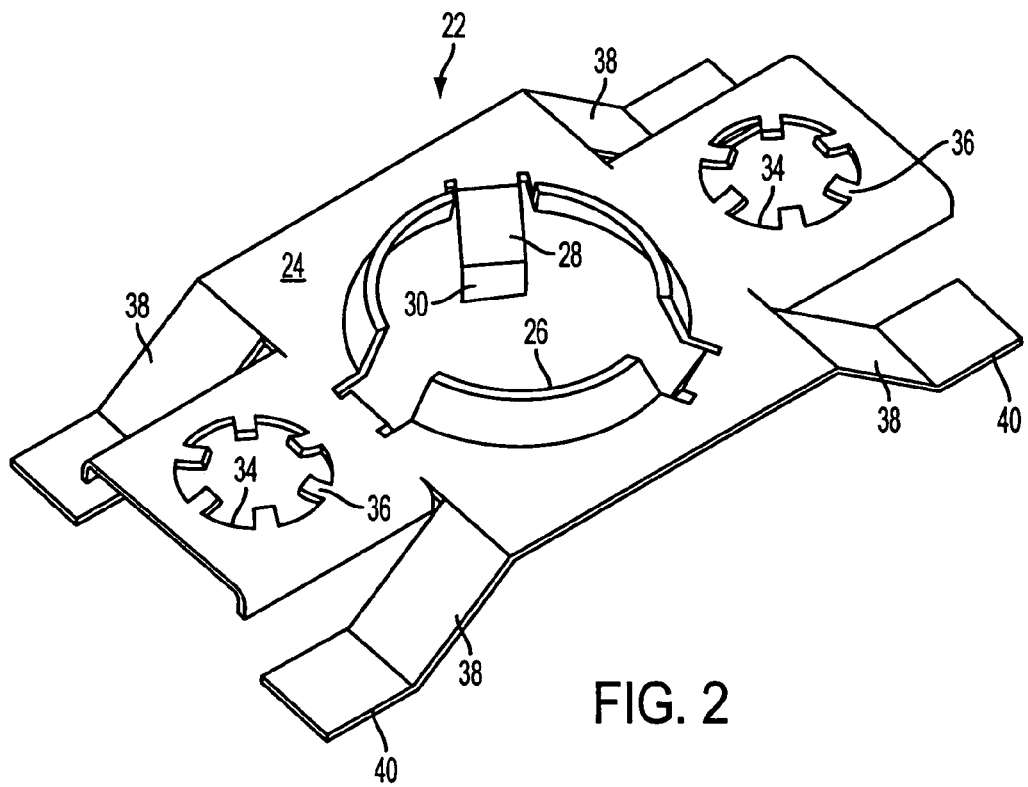
FIG. 2 is an enlarged, perspective view of the bearing retainer structure of the motor of FIG. 1.

With reference to FIG. 1, an electric motor is shown, generally indicated at 10, in accordance with the principles of the invention. The motor 10 is preferably configured for automotive HVAC systems. The electric motor 10 includes an armature structure, generally indicated at 12. The armature structure 12 includes a lamination stack 11 carrying windings 13 (the complete set of windings is not shown in the interest of clarity of FIG. 1). The armature structure 12 also includes a shaft 14 and a commutator 16 coupled with the shaft 14. Brushes 17 engage the commutator 16 and conduct electrical current to the windings 13 which are connected to the commutator 16. Each brush 17 is carried by a brush arm 15 that is coupled to a support 23 of the frame structure 18 of the motor 10. A spring 24 biases the brush arm 15 and thus brush 17 into contact with the commutator 16. Two permanent magnets 19 are disposed adjacent to the lamination stack 11 and are carried by the frame structure 18. The frame structure 18 is preferably molded from plastic, but can be of any die-cast material or thixomolding or powder metal process. A flux member 21, in the form of a ferrous coil spring, contacts (directly or indirectly) the permanent magnets 19 to define a flux path of the motor.

Figure 3:
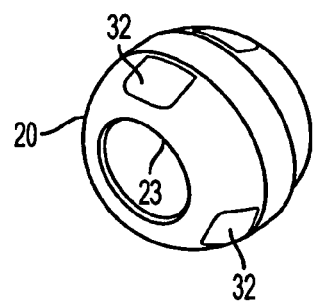
FIG. 3 is a perspective view of a sleeve bearing of the motor of FIG. 1.
Figure 4:
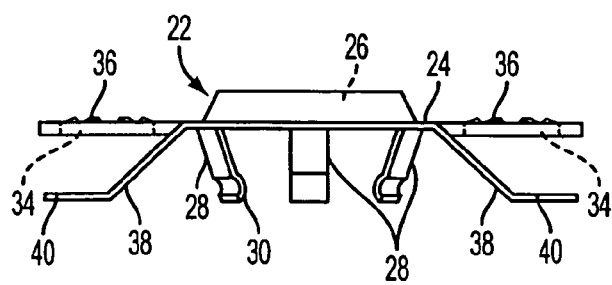
FIG. 4 is a side view of the bearing retainer structure of FIG. 2.

As shown in FIG. 1, a sleeve bearing 20 (FIG. 3) is provided at each end of the motor 10. Each bearing 20 has a bore 23 there through for receiving an associated end of the shaft 14 to support the shaft for rotation with respect to the frame structure 18.

In accordance with the principles of the invention and with reference to FIGS. 1–4, a bearing retainer structure, generally indicated at 22, is provided. The retainer structure 22 is preferably a single, stamped metal component and includes a main body 24 defining a bearing receiving opening 26. Resilient bearing holding members, preferably in the form of cantilevered legs 28, extend from the main body 24 and include locking structure, preferably in the form of protrusions 30. When the sleeve bearing 20 is disposed in the retainer structure 22, the holding members 28 are moved against the spring bias thereof and the protrusions 30 engage recesses 32, preferably defined in the sleeve bearing 20, to hold the sleeve bearing 20 with respect to the retainer structure 22.

As shown in FIG. 1, a pair of posts 33 extends from the frame structure 18 at each end of the motor 10. The main body 24 of the retainer structure 22 includes a pair of bores 34 there through, with each bore 34 receiving an associated post 33 of a pair of posts. A plurality of spring barbs 36 are provided about the periphery of each bore 34 and prevent the retainer structure 22 from backing-off the posts 33 (e.g., moving in a direction towards the associated end of the shaft) once assembled.

The retainer structure 22 also includes resilient spring tabs 38, extending from the main body 24. Each spring tab 38 has a generally planar portion 40 that engages with a portion of the frame structure 18. As shown in FIG. 1, the planar portion 40 of each spring tab 38 engages a surface 42 of the frame structure 18 preventing movement of the retainer structure 22 in a direction away from the associated end of the shaft 14. The spring tabs 38 are formed by cutting and bending portions of the main body 24.

The retainer structure 22 de-couples the bearing/frame structure noise utilizing two means:

1) The retainer structure 22, a unitary, stamped metal component, limits the contact area to the frame structure 18.

2) The stamped retainer structure 22 has low mass that leads to limited transmission of noise and thermal energy.

Another feature of the embodiment is the ability to adjust the motor endplay. Electric motors that utilize two sleeve bearings require endplay adjustment. Endplay can be defined as the axial movement of the armature structure 12 after assembly. This is controlled by the difference in the resultant assembled dimension between the thrust faces of the armature structure (dimension A in FIG. 1) and the distance between the inner thrust surfaces of the two bearings in the stator (frame structure 18). Endplay in HVAC motors is usually controlled from 0.1 mm to 1 mm to eliminate axial knocking sounds when the armature experiences axial vibration. The embodiment provides a means to set the desire armature structure endplay upon assembly of the motor. The following is a description of the sequence of steps used in setting the endplay:

1) The armature structure 12 with thrust washers 44 (FIG. 1) is held concentric to the frame structure 18 in a fixture.

2) One sleeve bearing 20 is loaded into the retainer structure 22 and is held in position via the legs 28. This locates and positions the bearing 20 with respect to the frame structure 18.

3) The retainer structure 22 is pushed onto the posts 33 and is retained from "backing off" the posts due to the spring barbs 36 engaging the posts 33, with the bearing 20 receiving an end of the shaft 14.

4) The retainer structure 22 is pushed axially down the posts until the desired endplay is set.

5) The spring tabs 38 of the retainer structure 22 exert a force outwardly (in a direction towards the associated shaft end). The spring tabs 38 push against the frame structure 18 and act as a counter force to the retainer structure 22 preventing the retainer structure from moving inwardly (in a direction away from the associated shaft end) and beyond the desired endplay position.

Only one retainer structure 22 is required for endplay adjustment (at one end of the motor). With both ends adjustable as in the illustrated embodiment, the armature structure 12 position can be adjusted in the motor 10 as well as the endplay.

Although a permanent magnet brush motor is shown, the retainer structure 22 applies to all electric motors that utilize sleeve bearings.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electric motor comprising:
   an armature structure including a shaft,
   a frame structure,
   at least one sleeve bearing operatively associated with an end of the shaft to support the shaft for rotation, and
   a unitary bearing retainer structure coupled with the frame structure and holding the at least one sleeve bearing, the retainer structure being constructed and arranged 1) to prevent movement of the retainer structure in a direction towards the end of the shaft, 2) to provide a spring force against the frame structure to prevent the retainer structure from moving in a direction away from the end of the shaft, and 3) to control endplay of the armature structure by controlling engagement of the retainer structure with the frame structure.

2. The motor of claim 1, wherein the retainer structure includes a main body defining a bearing receiving opening that receives the at least one sleeve bearing, the retainer structure including resilient, bearing holding members extending from the main body and including locking structure that engage with the at least one sleeve bearing to hold the sleeve bearing with respect to the retainer structure.

3. The motor of claim 2, wherein the resilient holding members are cantilevered legs.

4. The motor of claim 3, wherein the locking structure includes a protrusion on each leg, the sleeve bearing having a recess receiving an associated protrusion to hold the sleeve bearing with respect to the retainer structure.

5. The motor of claim 1, wherein the frame structure includes a pair of posts extending from an end thereof, and wherein the retainer structure includes a pair of bores there through, each bore receiving an associated post.

6. The motor of claim 5, wherein a plurality of spring barbs are provided about the periphery of each bore and engages an associated post, the spring barbs being constructed and arranged to prevent the retainer structure from moving in the direction towards the end of the shaft.

7. The motor of claim 1, wherein the retainer structure includes resilient spring tabs extending therefrom, the spring tabs engaging with a portion of the frame structure and providing the spring force against the frame structure to prevent the retainer structure from moving in a direction away from the end of the shaft.

8. The motor of claim 7, wherein each spring tab has a generally planar portion that engages the portion of the frame structure.

9. The motor of claim 7, wherein the retainer structure includes a main body portion and each spring tab is bent so as to extend from the main body portion.

10. The motor of claim 1, wherein the retainer structure is single, stamped metal component.

11. The motor of claim 1, wherein a sleeve bearing and a retainer structure is associated with each end of the shaft.

12. The motor of claim 1, wherein the armature structure further includes a lamination stack coupled with the shaft, a commutator coupled with the shaft, and windings carried by the lamination stack and connected to the commutator, the motor having brushes engaging the commutator to deliver electric current to the windings, and permanent magnets carried by the frame structure.

13. An electric motor comprising:
an armature structure including:
a shaft,
a lamination stack coupled with the shaft,
a commutator coupled with the shaft, and
windings carried by the lamination stack and connected to the commutator,
brushes engaging the commutator to deliver electric current to the windings,
a frame structure,
permanent magnets carried by the frame structure,
at least one sleeve bearing operatively associated with an end of the shaft to support the shaft for rotation, and
means for retaining the at least one sleeve bearing and for controlling endplay of the armature structure by controlling engagement of the means for retaining with the frame structure.

14. The motor of claim 13, wherein the means for retaining includes a main body defining a bearing receiving opening that receives the at least one sleeve bearing, the means for retaining including resilient, bearing holding members extending from the main body and including locking structure that engage with the at least one sleeve bearing to hold the sleeve bearing with respect to the means for retaining.

15. The motor of claim 14, wherein the resilient holding members are cantilevered legs.

16. The motor of claim 15, wherein the locking structure includes a protrusion on each leg, the sleeve bearing having a recess receiving an associated protrusion to hold the sleeve bearing with respect to the means for retaining.

17. The motor of claim 13, wherein the frame structure includes a pair of posts extending from an end thereof, and wherein the means for retaining includes a pair of bores there through, each bore receiving an associated post.

18. The motor of claim 17, wherein a plurality of spring barbs are provided about the periphery of each bore and engages an associated post, the spring barbs being constructed and arranged to prevent the means for retaining from moving in the direction towards the end of the shaft.

19. The motor of claim 13, wherein the means for retaining further includes resilient spring tabs extending therefrom, the spring tabs engaging with a portion of the frame structure and providing the spring force against the frame structure to prevent the retainer structure from moving in a direction away from the end of the shaft.

20. The motor of claim 19, wherein each spring tab has a generally planar portion that engages the portion of the frame structure.

21. The motor of claim 13, wherein the means for retaining includes a main body portion and each spring tab is bent so as to extend from the main body portion.

22. The motor of claim 13, wherein the means for retaining is single, stamped metal component.

23. The motor of claim 13, wherein a sleeve bearing and a means for retaining is associated with each end of the shaft.

* * * * *